US007668685B2

(12) United States Patent
Kathan et al.

(10) Patent No.: US 7,668,685 B2
(45) Date of Patent: Feb. 23, 2010

(54) ELECTRICAL CONNECTOR AND PROCESS FOR DECENTRALIZED STORAGE OF THE PARAMETERS OF A SENSOR

(75) Inventors: Benno Kathan, Wasserburg (DE); Alfred Wagner, Bodnegg (DE)

(73) Assignee: i f m electronic GmbH, Essen (DE)

( * ) Notice: Subject to any disclaimer, the term of this patent is extended or adjusted under 35 U.S.C. 154(b) by 339 days.

(21) Appl. No.: 11/549,323

(22) Filed: Oct. 13, 2006

(65) Prior Publication Data

US 2007/0126570 A1 Jun. 7, 2007

(30) Foreign Application Priority Data

Oct. 13, 2005 (DE) ....................... 10 2005 049 483

(51) Int. Cl.
*G06F 17/40* (2006.01)

(52) U.S. Cl. ........................ 702/127; 702/187; 439/955

(58) Field of Classification Search ................. 439/489, 439/955; 702/127, 138, 187, 188; 340/505
See application file for complete search history.

(56) References Cited

U.S. PATENT DOCUMENTS 5,025,653 A * 6/1991 Schuldt ...................... 73/23.2
5,353,009 A * 10/1994 Marsh et al. ................ 340/505
6,243,654 B1 6/2001 Johnson et al.
6,786,765 B2 9/2004 Bauermeister et al.
2003/0069713 A1 4/2003 Friedl et al.

FOREIGN PATENT DOCUMENTS

DE 4114921 A1 11/1992
DE 102 03 555 A1 8/2003
DE 102 18 606 A1 11/2003
DE 10 2004 056 807 A1 6/2005
WO 2005/031339 A1 4/2005

* cited by examiner

*Primary Examiner*—Neil Abrams
(74) *Attorney, Agent, or Firm*—David S. Safran; Roberts Mlotkowski Safran & Cole, P.C.

(57) ABSTRACT

An electrical connector for connection to a sensor has an integrated microcontroller, with a plug-and-socket connection for connection to an interface of the sensor and with an electronic circuit. With the connector, the data of a sensor, especially the parameter data, can be mirrored outside the sensor in a simple and economical manner so that the data are available at any time and as much as possible on site. The electronic circuit has a memory for storage of data, especially parameter data and characteristic data of the sensor, and a microcontroller, the microcontroller operating the interface of the sensor, and depending on the characteristic data of the sensor, either reading data, especially parameter data, out of the sensor via the interface and storing it in the memory, or reading data stored in the memory, especially parameter data, out of the memory and transmitting them via the interface into the sensor.

10 Claims, 9 Drawing Sheets

ELECTRICAL CONNECTOR AND PROCESS FOR DECENTRALIZED STORAGE OF THE PARAMETERS OF A SENSOR

BACKGROUND OF THE INVENTION

1. Field of the Invention

The invention relates to an electrical connector for connection to a sensor which has an integrated microcontroller, with a plug-and-socket connection for connection to an interface of the sensor and with an electronic circuit. In addition, the invention relates to a process for decentralized storage of the parameters of a sensor or for parameterization of a sensor.

2. Description of Related Art

Sensors with an integrated microcontroller, so-called "intelligent" sensors, are being increasingly used for a host of applications in automation. Thus, for example, in process measurement engineering, the pressure, temperature, level, flow velocity and flow rate of gases, liquid or solid media, but also of loose bulk material, can be monitored or measured. By using "intelligent" sensors, individual sensors can be used for different applications; this reduces the diversity of types and at the same time increases possible applications.

However, in this way, it is often necessary for the sensors to require more and more parameters in order to be able to optimally adapt the very universally held functions of the sensor to the respective application. The parameters to be set can be, for example, one or more operating points. In addition to one or more adjustable operating points, it can often be necessary to set a value for hysteresis. In addition to the operating point or the limits of the measurement range, the parameters to be set can be, for example, the choice of a certain measurement medium, a temperature range, a time delay or the type of output signal. Sensors with ten and more parameters to be set are thus not a rarity.

In a host of these sensors, the actual measurement unit and the evaluation unit, or at least part of the evaluation unit, are accommodated jointly in the housing, the evaluation unit having especially an indicating and setting display. With these displays, which often have a LCD display or a bar graph, on the one hand, the accurate and reproducible setting of a parameter via the corresponding buttons is possible, and on the other hand, in addition to the actual measurement values, the set parameters are also indicated using the display.

Based on the space which is generally only available to a very limited degree for the indicating and setting display, usually only two or three buttons are available for inputting of the individual parameters, so that operation of the sensor, and especially the inputting of the individual parameters, is not easily understandable. In this connection, different button combinations must often be pushed in order to be able to set the individual parameters. Programming or parameterization of these sensors is then both relatively time-consuming and also fault-susceptible, so that programming and parameterization of the sensor on site can only be done by trained personnel.

The "intelligent" sensors under consideration generally have a serial interface which can be operated via the sensor terminal generally made as an M12 connector pair. The terminal is used, moreover, for electrical supply of the sensor and also as a switching output. To do this, a corresponding supply cable with a mating connector is connected to the terminal. Using a computer or a corresponding programming device, programming and parameterization of the sensor can be performed via the digital interface.

In addition to the above described problems in the parameterization of the sensors, for these "intelligent" sensors, in addition, there is generally still the requirement to document the set parameters. As described above in conjunction with parameterization, this can take place by a connection of the sensor interface to a computer or laptop. However, the disadvantage here is that, then, the set parameters of an individual sensor are no longer available directly on site, i.e., on the respective sensor. For this reason, in practice, the set parameters are often impressed onto a metal plate as the parameter plate which is attached directly to the machine in the vicinity of the sensor which is to be monitored. However, this type of documentation of the set parameters is relatively complex, and thus, expensive. Furthermore, it must be assumed that, in the course of operation, individual parameters are subsequently changed; this then is generally no longer documented afterwards.

If a sensor defect occurs so that the sensor must be replaced, it often happens that the parameters of the defective sensor which were set last are not completely documented or are not directly present on site. Then, if the parameters of the defective sensor can no longer be easily read out or there are no correspondingly trained personnel on site at the time of the fault, parameterization of the new sensor—if at all—is only possible with a relatively great time expenditure, so that a relatively long shutdown of the monitored machine or an entire system takes place under certain circumstances.

SUMMARY OF THE INVENTION

Therefore, a primary object of this invention is to mirror the data of a sensor, especially the parameter data, outside the sensor in a simple and economical manner, so that the parameter data are available at any time and as much as possible on site. Moreover, a further object of the invention is to devise a process with which the parameters of a sensor can be easily stored decentrally and a sensor can be easily parameterized.

These objects are achieved with an electrical connector for connection to an "intelligent" sensor of the initially described type which has a plug-and-socket connection for connection to an interface of the sensor and an electronic circuit, the electronic circuit having a memory for storage of data, especially parameter data and characteristic data of the sensor, and a microcontroller which operates the interface of the sensor, and depending on the characteristic data of the sensor, either reads data, especially parameter data, out of the sensor via the interface and stores them in the memory, or reads data stored in the memory, especially parameter data, out of the memory and transmits them via the interface to the sensor.

By using an electrical connector, it becomes possible to provide the data directly on the sensor without the need for other auxiliary means such as a computer or a special programming device. Based on a comparison of the characteristic data of the current sensor undertaken in the microcontroller with the characteristic data filed in the connector memory, the direction of data transfer is determined automatically by the connector; either data from the sensor are read into the connector, or vice versa, data from the connector are written into the sensor.

Based on comparison of the characteristic data of the sensor, it can thus be automatically established by the microcontroller of the connector whether the sensor connected to the electrical connector has been replaced or not. Because the electric connector has not only a memory, but also a microcontroller, the connector is thus an "intelligent" connector, operation and handling of the electrical connector is extremely simple and thus can be performed without requiring correspondingly trained personnel. The individual possible situations and the actions performed by the electric connector are explained in detailed below in conjunction with the process of the invention.

According to a first preferred configuration of the invention, the electric connector has a separate housing for holding the electronic circuit and a second plug-and-socket connection for connecting a cable which has a corresponding connector. Such an electrical connector, in the simplest case, can then be connected directly with the first plug-and-socket connection to the terminal of the electrical sensor. The electrical connector is then connected simply between the sensor and the supply cable which is otherwise connected to the sensor terminal.

According to an alternative configuration of the invention in which the electrical connector likewise has a housing for holding the electrical circuit, instead of a second plug-and-socket connection, there is an electric cable which is connected directly to the housing or the electronic circuit. The electric connector is then connected directly to the cable set for the electrical sensor.

In addition to making the electric connector as an individual connector, with a second plug-and-socket connection or with a cable set, the electrical connector can also be integrated in a distributor box, a so-called sensor-actuator box or splitter box, and can be connected to a common bus line via the individual sensors or actuators. In this regard, there can also be several electrical connectors housed jointly in a sensor-actuator box or splitter box, the individual electrical connectors then having the box as a common housing.

It was stated above that the electrical connector of the invention independently makes the decision whether data are to be read or written, i.e., the direction of data transfer is itself established. To select the direction of data transfer, thus, a beginning element is not necessary. Preferably, data exchange starts automatically without actuating the control element when the sensor is started. After completion of data exchange, the electrical connector is "passively" switched so that the standard I/O function of the sensor is not adversely affected. The interposition of the electrical connector between the terminal of the sensor and the cable set does not becomes noticeable either on the sensor or on a control or evaluation unit connected to the sensor via the connecting cable.

According to a preferred configuration of the electrical connector, there are two display elements, especially two LEDs for visualization of the operating state of the connector, especially for display of data transfer and for display of the data direction, in the housing. The display elements are preferably made as two arrows pointing in opposite directions so that, by illuminating one of the two arrows, the data direction can be directly read. The display elements are used simply for signaling the current operating state of the connector. In this regard, there are preferably the following states of the display elements:

A display element does not light up:

A sensor with an interface is not connected.

A display element blinks with increasing frequency:

Incipient data transfer in the direction assigned to the display element is announced.

Irregular flickering of the display element:

Data transfer takes place in the direction assigned to the display element.

Continuous lighting of a display element:

Data exchange in the direction assigned to the display element has been successfully completed.

Fast blinking of a display element with a constant frequency:

An error has occurred in data transfer in the direction assigned to the display element.

The aforementioned states of the display elements can thus display to the operator not only the data direction, but moreover, also can announce data transfer or can display an error in data transmission. The prior announcement of data transfer is used in this connection as a warning indication for the user that the user has the opportunity to prevent unwanted data transmission or data transmission in the unintended direction. In addition to displaying the direction of the data transmission completed last, proper voltage supply of the electrical connector or the sensor connected to the connector can also be displayed to the user by continuous lighting of the display element. The display element then acts as the operating state display for the sensor.

It was stated initially that the electronic circuit of the electrical connector has a memory for storage of the sensor data. This memory can be, for example, an EEPROM located permanently on the electronic circuit. However, in addition, it is also possible to use an interchangeable storage medium, i.e., an interchangeable memory, instead of a fixed memory. Here, the memory can be especially a SD memory card. A SD memory card is a digital storage medium which has been used for years in various electronic devices, especially digital cameras and in MP3 players. The SD memory card has standardized dimensions and has the advantage that it can be inserted directly into the corresponding receiver on a computer so that data can be read out from the SD memory card or can be written onto the SD memory card.

Due to its large memory capacity of currently up to 4 GB, especially a SD memory card can also be used to store, in addition to the parameter data and characteristic data of the sensor, other data, especially various measurement data of the sensor. This then yields the possibility of analyzing the history of the sensor, for example, for a defective sensor, in order to be able to more easily ascertain the possible cause of the fault. Of course the storage of additional data, especially measurement data, is not limited to the use of an interchangeable storage medium, but can fundamentally also be implemented in a memory permanently connected to the electronics. However, when using an interchangeable storage medium, handling is facilitated in the above described analysis of the history of the sensor.

The electrical connector in accordance with the invention, as explained above, simplifies automatic storage of the current parameter data of the sensor directly on the sensor itself. Moreover, the connector can also be used for permanent archiving of the sensor parameters. In this connection, there is advantageously an electronic or electromechanical write protection for safeguarding the data stored in the memory. Electronic write protection can be activated, for example, using a computer or programming device connected to the connector. However, it is also possible for there to be an electromechanical element for setting the write protection directly on the electrical connector. In this connection, the write protection can be activated without special auxiliary means.

If there is write protection for safeguarding the data stored in the memory, the display element preferably can display a further state. Brief flashing of one or both display elements can be used as signaling for the electrical connector or sensor being write-protected so that data transfer is not possible. For documentation purposes, it can be provided that, on the housing of the electrical connector, an inscription field or mount for the inscription plate is made.

The aforementioned objects are, moreover, achieved with a process for decentralized storage of the parameters of a sensor or for parameterization of a sensor with an electrical connector, the sensor having an integrated microcontroller and an interface and the connector having a plug-and-socket connection and an electronic circuit with a memory and a microcontroller in that the connector is connected to the sensor interface using its plug-and-socket connection, that the microcontroller of the connector compares the characteristic data of the sensor to the characteristic data stored in the memory and depending on the result of this comparison reads either data, especially parameter data, out of the sensor via the interface and stores them in the memory, or reads the data stored in the memory, especially parameter data, out of the memory and transmits them into the sensor via the interface.

As already stated above in conjunction with the electrical connector of the invention, in the process according to the invention, the direction of data transport is automatically selected by the microcontroller of the connector using the comparison of the characteristic data of the sensor with the characteristic data stored in the memory.

Sensors of the type under consideration generally have an article code which identifies the sensor type and a serial number which identifies the respective sensor as characteristic data. The article code is then the same for all sensors of a sensor type, while each individual sensor has its own serial number. In a comparison of the characteristic data of the sensor with the characteristic data stored in the memory, the possibilities are the following:

The article code read out from the sensor, the article code stored in the sensor and the serial number stored in the memory agree.

The article code read out from the sensor and the article code stored in the sensor agree, while as the serial number read out of the sensor and the serial number stored in the memory do not agree.

Neither the article code read out of the sensor and the article code stored in the sensor agree nor the serial number read out of the sensor and the serial number stored in the memory agree.

In the first case, this means that sensor replacement has not taken place, i.e., the electrical connector continues to be connected to the same sensor. In this case, data, especially parameter data, are read out of the sensor via the interface and are stored in the memory. According to a first version of the process, basically all data are read out of the sensor and stored in the memory. The data which have already been stored in the memory of the electrical connector are thus completely overwritten. According to an advantageous embodiment of the process, in the first case, however, only the data which differ from the already stored data are read out of the sensor and stored in the memory of the connector. Thus, only then are the sensor data updated when they have in fact changed, and only the altered data being stored. In this way, a distinct reduction of the time required for data exchange is achieved.

In the second case, either the original sensor has been replaced by a new sensor of the same type, for example, due to a defect, or the electrical connector has been connected to another sensor of the same sensor type. Both are recognized by the microcontroller of the connector as sensor replacement. The microcontroller then causes data transfer from the connector into the sensor so that the data stored in the memory of the connector, especially the parameter data, are read out of the memory and transmitted into the sensor via the interface. A new sensor is automatically parameterized with exactly the same parameters which had been set in the "old" sensor. This greatly simplifies the replacement of a defective sensor since only the new sensor (same sensor type) need be connected instead of the defective sensor. Parameterization of the new sensor by the user is no longer necessary since parameterization is undertaken automatically by the electrical connector.

In the third case, in which neither the article code nor the serial number agree, either a new sensor of another sensor type has been connected to the electrical connector, or a new electrical connector is used. The latter thus represents the first start-up of the electrical connector. In both cases, the data are read out from the sensor and stored in the memory of the connector. If, instead of an old sensor of a first sensor type, a new sensor of another sensor type is connected to the electrical connector, this means that the data stored in the connector memory are being overwritten.

Unintentional overwriting of the data in the connector can be prevented by announcing the direction of data transmission by blinking of the display element before carrying out data transmission, as described above in conjunction with the preferred execution of the electrical connector with two display elements. If the operator has accidentally connected a sensor of another sensor type when a defective sensor is being replaced, data transfer from the sensor into the connector instead of the actually expected data transfer from the connector into the sensor is announced by the display elements. In this way, the oversight is thus pointed out to the user. By promptly replacing the sensor, unwanted data transfer can be stopped.

The above described process of data transfer can be used not only for parameterization of a new sensor in the case of replacement, as described above in the second case, but also for parameterization of several sensors of the same sensor type with the same parameter data. In larger systems with several machines, it can happen that several sensors of the same sensor type are used and must all be programmed with the same parameter data. In this case, with the electrical connector in accordance with the invention and with the process of the invention, it is sufficient if the electrical connector is connected to a sensor which has either already been parameterized or is then being parameterized. As described in conjunction with the second case, this leads to the current parameter data being read out of the sensor and being stored in the memory of the connector. Instead of time-consuming programming of all sensors of the same sensor type, it is then sufficient if the connector is connected in succession to the individual sensors. In this way, all sensors of the same sensor type are then automatically programmed identically; misprogramming is precluded.

According to another advantageous embodiment of the process according to the invention and of the electrical connector of the invention, data exchange takes place automatically between the sensor and the connector each time the sensor is started up. However, of course, it is also possible for data exchange between the sensor and connector to be started by actuating a button on the sensor or on the connector. The advantage of automatic data exchange each time the sensor is started up apparently lies in that active operation is not necessary. On the one hand, this avoids errors, and on the other hand, it is ensured that even a subsequent change of parameters is undertaken automatically in the next restart of the sensor.

Another advantageous configuration of the process of the invention calls for the data stored in the connector memory to be read out into a computer for safeguarding and/or analysis. In this connection, a suitable interface is optionally connected between the connector and the computer. Moreover, the process can be further made in that data, especially parameter data, can be written conversely from a computer, optionally again over a suitable interface, into the connector memory. This yields the advantage that programming of the sensor can take place without the user having to know about the sensor with respect to its operation and programming. To do this, only a correspondingly pre-parameterized connector need be made available to the user which he must then simply connect to the sensor.

In particular, there are a host of possibilities for embodying and developing the electrical connector and and the process in accordance with the invention. To do this, reference is made to the description of preferred embodiments with reference to the accompanying the drawings.

DETAILED DESCRIPTION OF THE INVENTION

Figure 1:
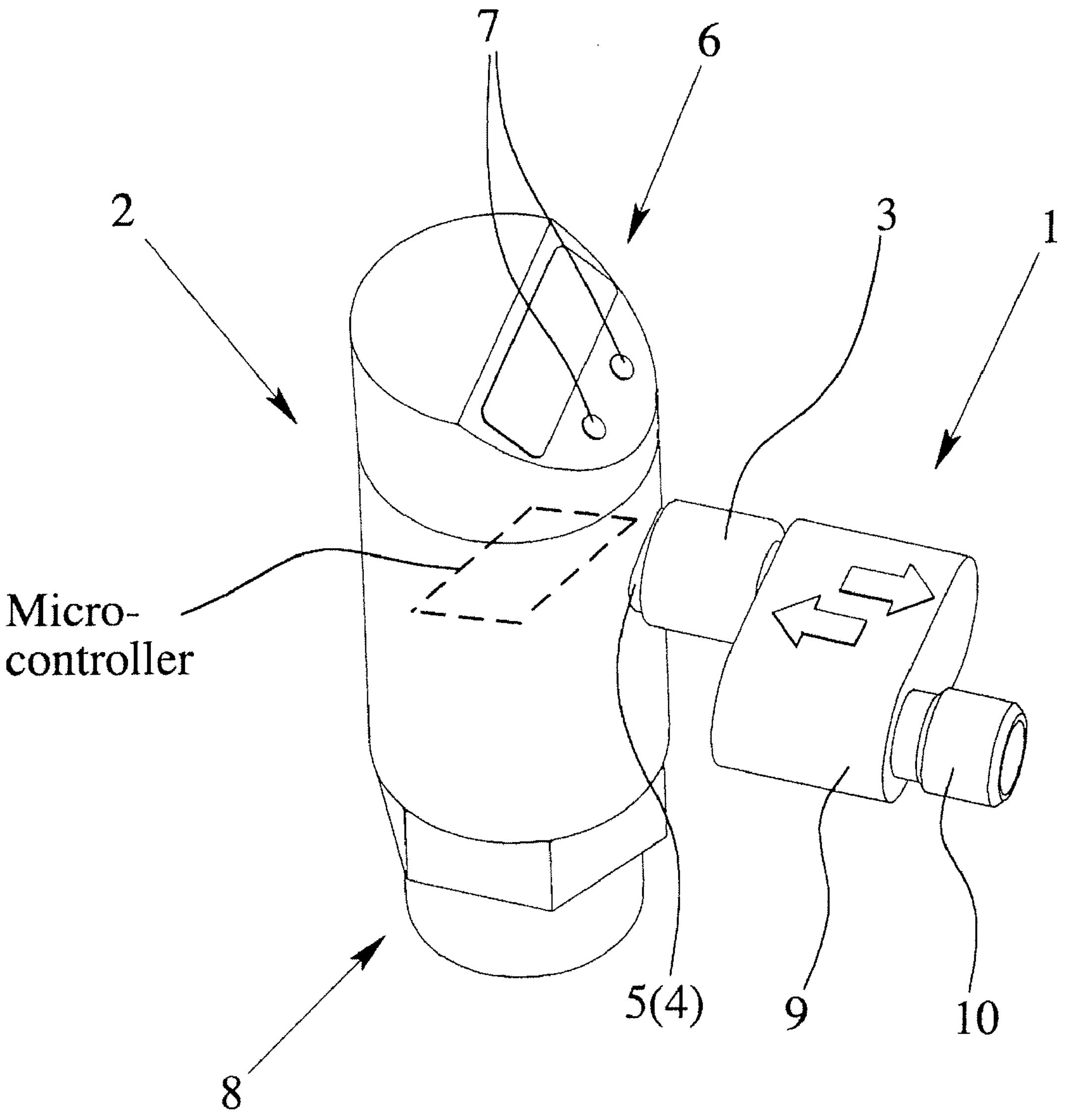
FIG. 1 is a perspective view of a first embodiment of an electrical connector connected directly to a sensor.
Figure 9:
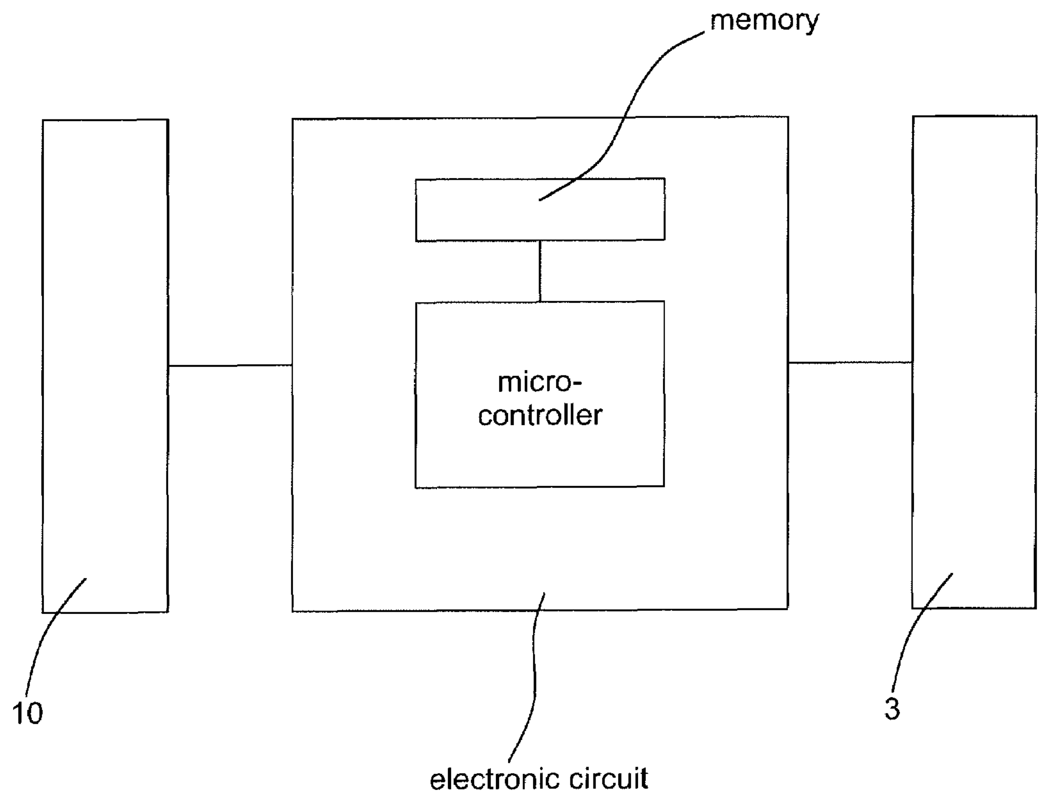

The figures show an electrical connector 1 for connection to a sensor 2 which has an integrated microcontroller (shown by broken lines in FIG. 1). In this connection, the electrical connector 1 shown uses a plug-and-socket connection 3 for connection to an interface 4 of the sensor 2 and an electronic circuit (shown by broken lines in FIG. 2), the electronic circuit having a memory for storage of the data of the sensor 2, and a microcontroller (shown in FIG. 9).

Figure 3:
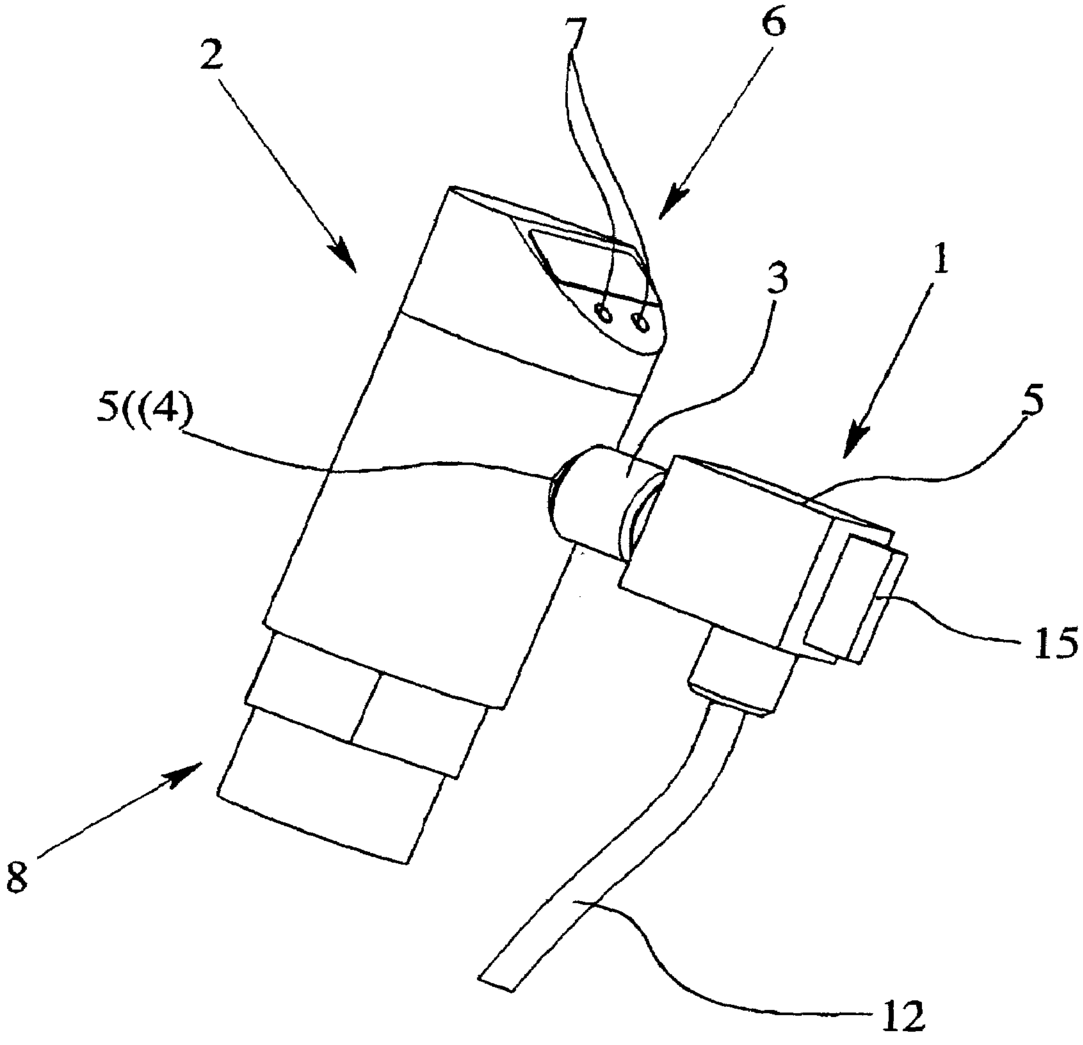
FIG. 3 is a perspective view of a second embodiment of an electrical connector connected directly to the sensor.

The sensor 2 which is, for example, a pressure sensor, in the embodiments of FIGS. 1 & 3, has a M12 connector pair 5 as the interface 4. The sensor 2 is supplied, on the one hand, with electricity via the terminal formed by the M12 connector pair, and on the other hand, the output signal of the sensor 2 is output. Here, the output can be a switching and/or analog output; in the sensors 2, the analog output at least selectively issues either a current signal in the range of 4-20 mA or a voltage signal in the range of 0-10 V.

The sensor 2 shown in FIGS. 1 & 3 also has an indicator and setting display 6 on which several parameters of the sensor 2 can be input via two buttons 7. Thus, for example, in addition to the measurement range and the operating thresholds, a country-specific pressure unit (bar/mbar, kPa/MPa, psi) can be selected. To connect to a container or pipe carrying the medium to be monitored and for connection to the medium, the sensor 2 has a process connection 8.

In the illustrated embodiments, the electrical connector 1 has its own housing 9 which holds the electronic circuit located in it. Moreover, in the versions as shown in FIGS. 1, 2, 5, 6 and 8, there is a second plug-and-socket connection 10 for connection of a cable 12 which has a corresponding connector 11. In contrast, in the version of the electrical connector 1 shown in FIGS. 3 & 4, the connector is directly provided with a cable 12, one end of the cable 12 being surrounded by the housing 9 and the individual wires of the cable 12 being connected to the electronic circuit within the housing 9.

In particular, it is apparent from FIGS. 1 & 3 that the electrical connector 1 is connected on one side directly via its plug-and-socket connection 3 to the connector pair 5 of the sensor 2, and on the other side, either via the second plug-and-socket connection 10 or directly to the supply cable 12 of the sensor 2. The connector 1 is thus connected simply between the sensor 2 and the supply cable 12, the connector 1 adversely affecting neither the supply of the sensor 2 nor the standard I/O function of the sensor 2 in normal operation.

Figure 2:
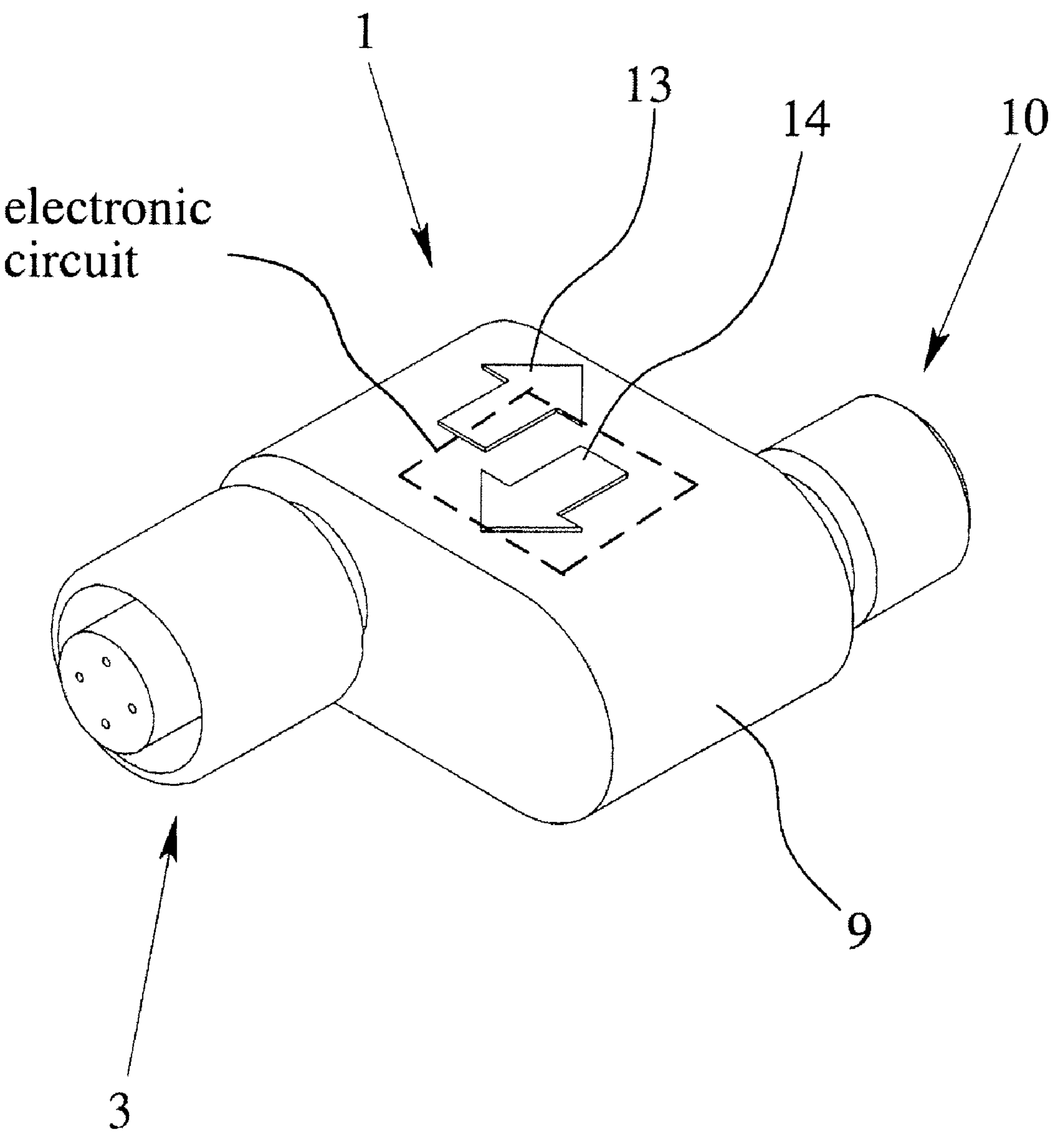
FIG. 2 is an enlarged view of the connector as shown in FIG. 1.
Figure 5A:
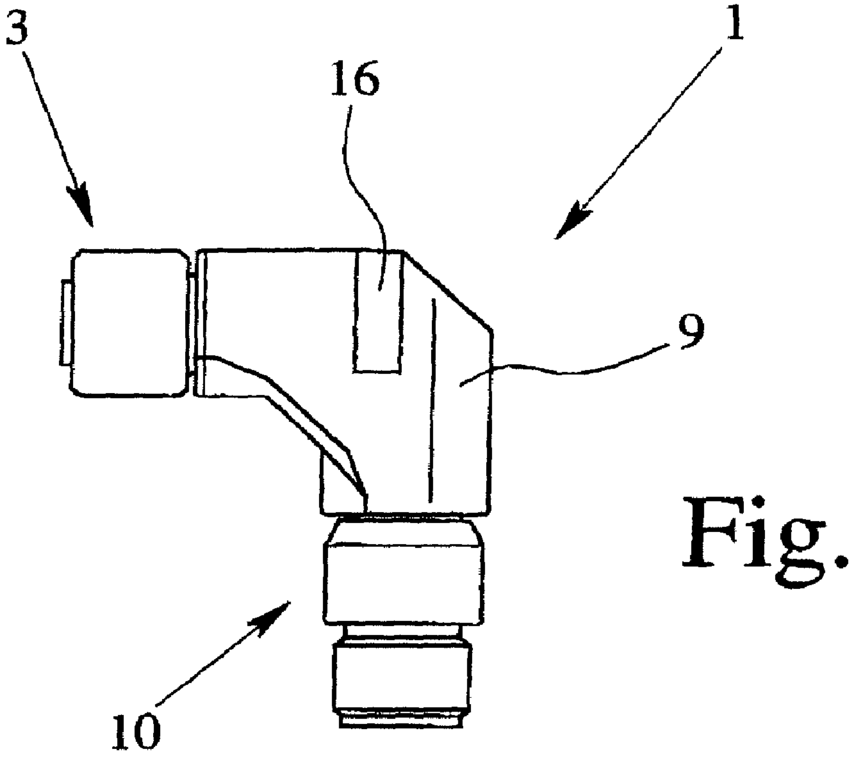
Figure 5B:
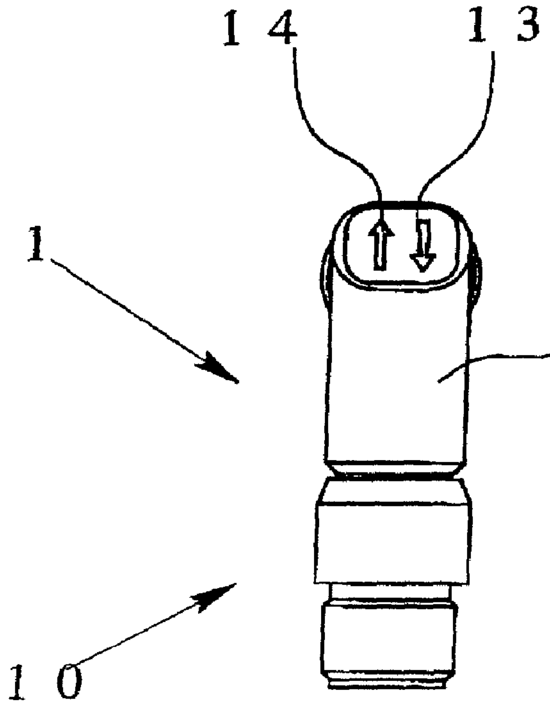

As is shown especially in FIGS. 2 & 5, the electrical connector 1 of the invention has two LEDs 13, 14, as display elements for visualization of the operating state of the connector 1. The two LEDs 13, 14 are made in the shape of two arrows pointing in opposite directions so that depending on which LED 13, 14 lights or blinks, it is immediately apparent to the operator in which direction data transfer has taken place or is taking place.

Figure 4:
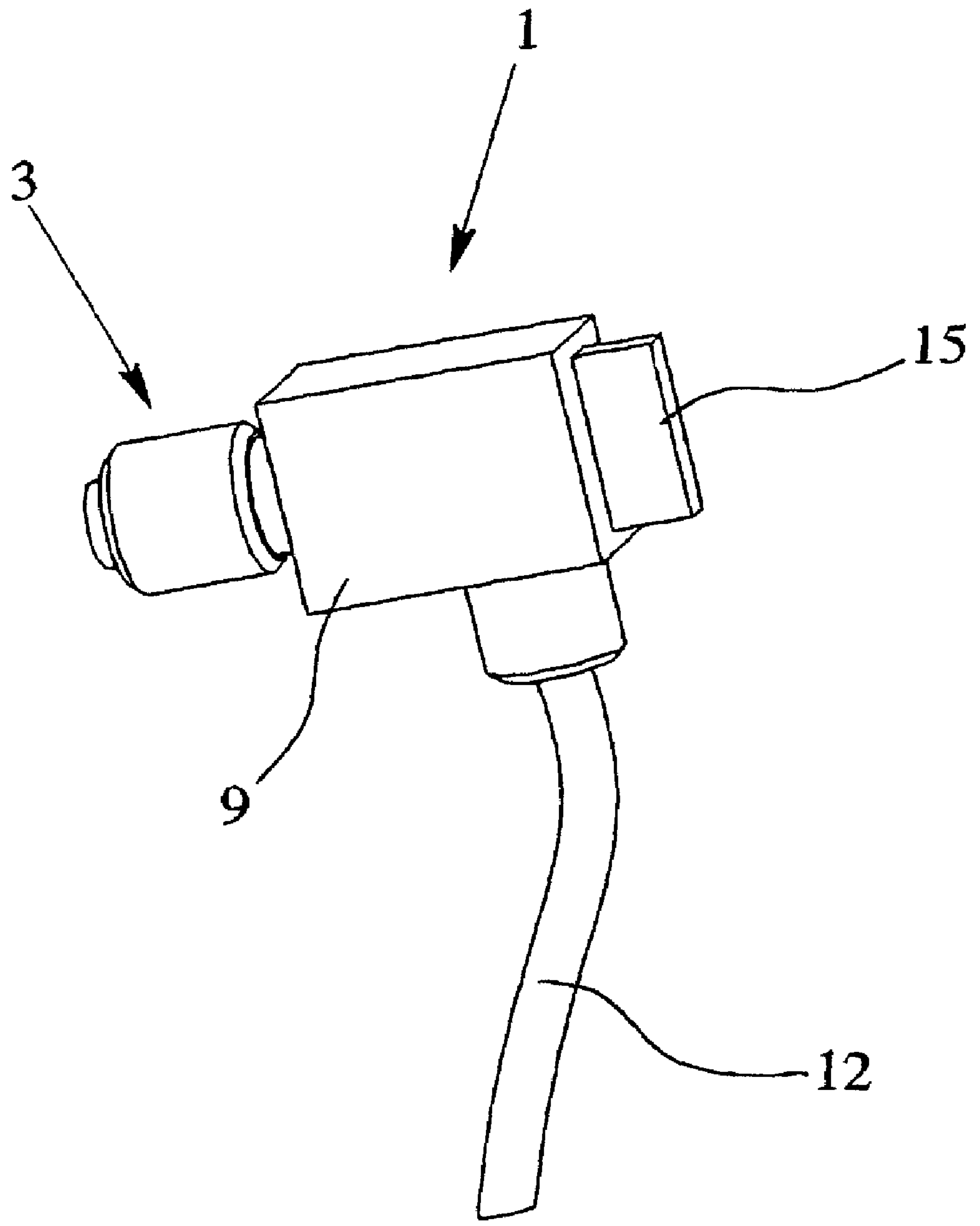
FIG. 4 is an enlarged view of the connector as shown in FIG. 4, FIGS. 5*a* & 5*b* show a further embodiment of an electrical connector in accordance with the invention, as seen from the side and from behind, respectively.

In the embodiment of electrical connector 1 in accordance with the invention shown in FIGS. 3 & 4, an interchangeable storage medium 15 which can simply be pulled out of the housing 9 of the connector 1 is used as the memory. The interchangeable storage medium 15 can be especially a SD memory card, as has been used for some years especially in digital cameras. By using an interchangeable storage medium 15, readout, analysis and storage of the data stored by the connector 1 by means of a computer is especially easily possible since, for this purpose, the interchangeable storage medium 15 need only be inserted into a corresponding receiver of the computer.

Figure 6:
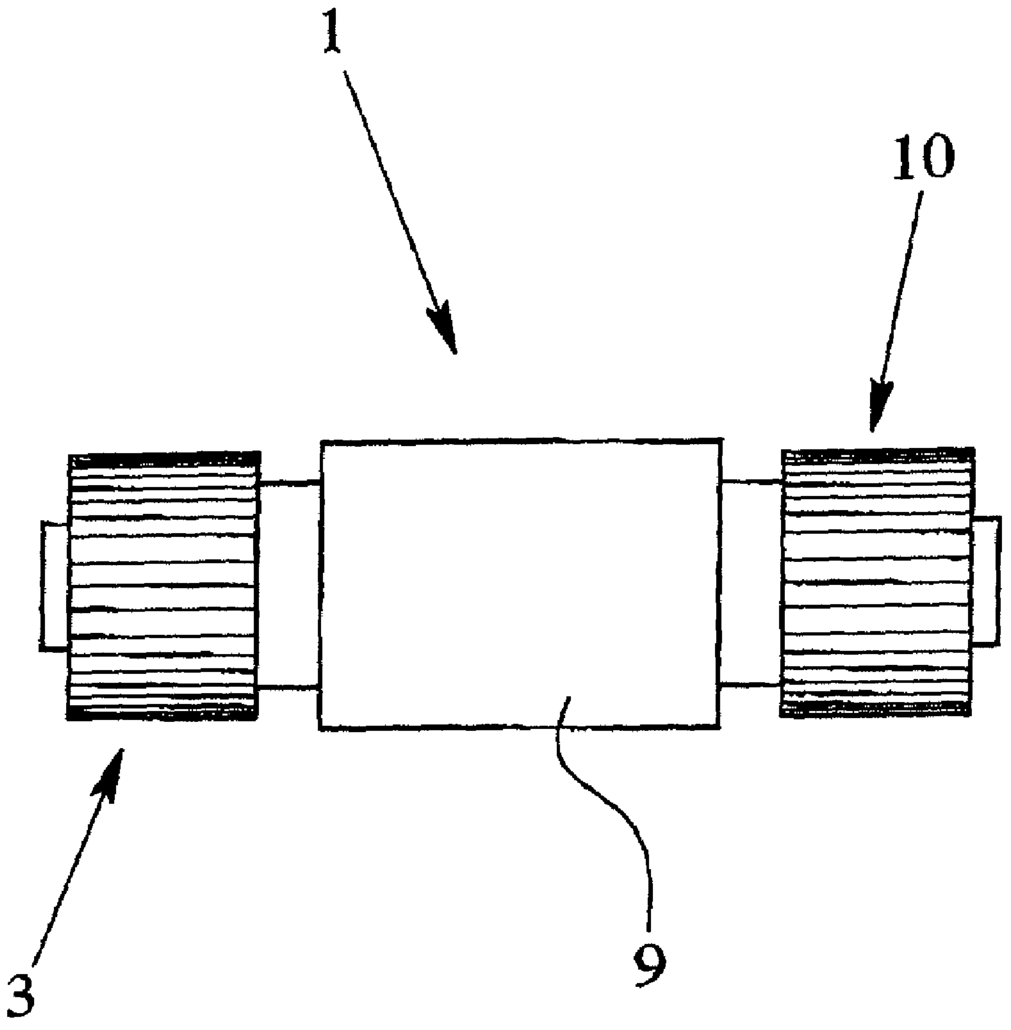
FIG. 6 shows a fourth embodiment of an electrical connector of the invention.

The electrical connectors 1 which are shown in FIGS. 2, 5 & 6 and each of which have, in addition to a first plug-and-socket connection 3, a second plug-and-socket connection 10, the two plug-and-socket connections 3, 10 being made as a M12 connector pair, differ essentially only by the specific geometrical configuration of the connector 1 and of the housing 9. FIG. 5 shows one version of the electrical connector 1 as an angle connector which is advantageous when the available space is very limited in front of the connector pair 5 of the sensor 2. Moreover, for the connector 1 as shown in FIG. 5, a holding device 16 for an inscription plate is provided in the housing 9. Alternatively, there can also be an inscription field on the housing 9 so that, for documentation purposes or in archiving the electrical connector 1, unambiguous assignment of the respective connector 1 to a certain sensor 2 is easily possible.

Figure 7:
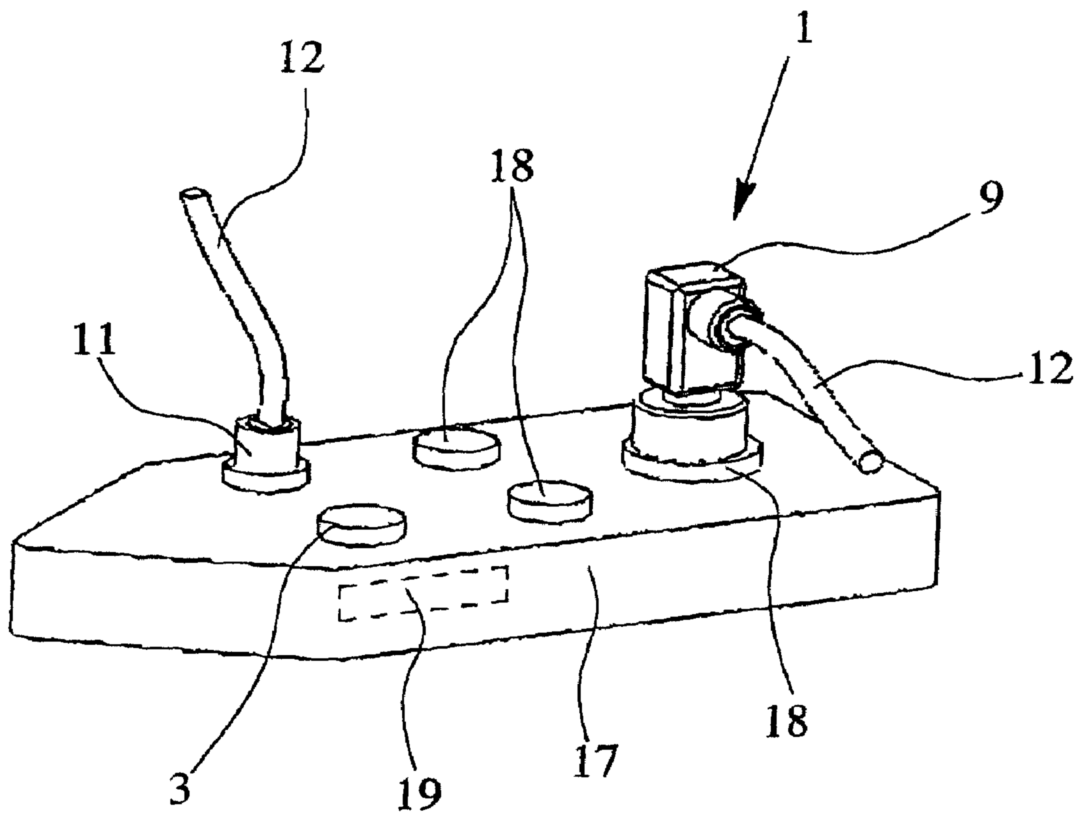
FIG. 7 is a perspective view of a splitter box with an electrical connector connected thereto, FIGS. 8*a* & 8*b* each show a respective modified version of the FIG. 2 connector, and FIG. 9 schematically shows the electronic circuit acting between first and second plug-and-socket connections.

FIG. 7 shows a distributor box 17 which is often also called a splitter box or a sensor-actuator box. Several sensors 2 can be connected with a common bus line via such a splitter box 17. To do this, the splitter box 17 has a corresponding number of connector pairs 18 via which the individual sensors 2 can be connected to the splitter box 17 by a cable 12. Instead of the direct arrangement of the electrical connector 1 shown in FIGS. 1 & 3, directly on the sensor 2, the electrical connector 1, if necessary, can also be slipped on a splitter box 17 away from the sensor 2. The connection of the electrical connector 1 to the sensor 2 can thus also take place via a cable 12. This is advantageous when the sensor 2 is exposed to hard and rough ambient conditions due to its position.

Moreover, it is also possible to arrange several electrical connectors 1 directly, i.e., without their own housing 9, within the splitter box 17. In such a case, the electronic circuit 19 of the electrical connector 1 (shown by the broken line together with the plug-and-socket connection 3 which, at the same time, forms a connector pair 18 of the splitter box 17) is located within the splitter box 17. In this case, the sensor 2 to be connected need only be connected to the splitter box 17 with a cable 12, as has been conventional in the past.

Figure 8A:
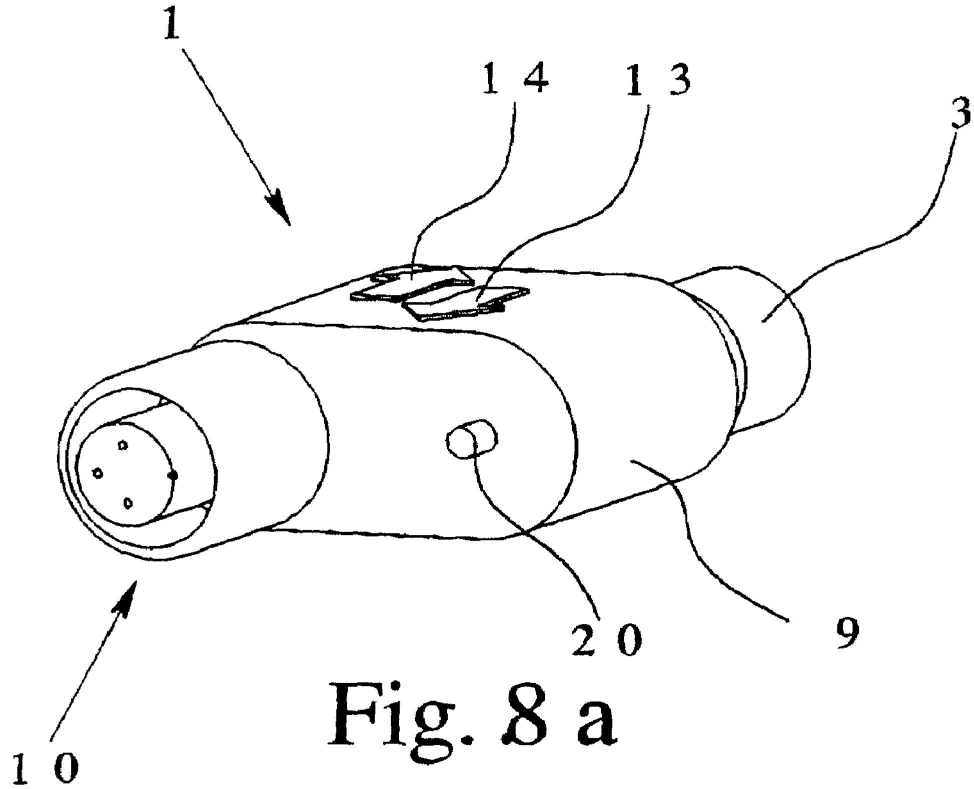
Figure 8B:
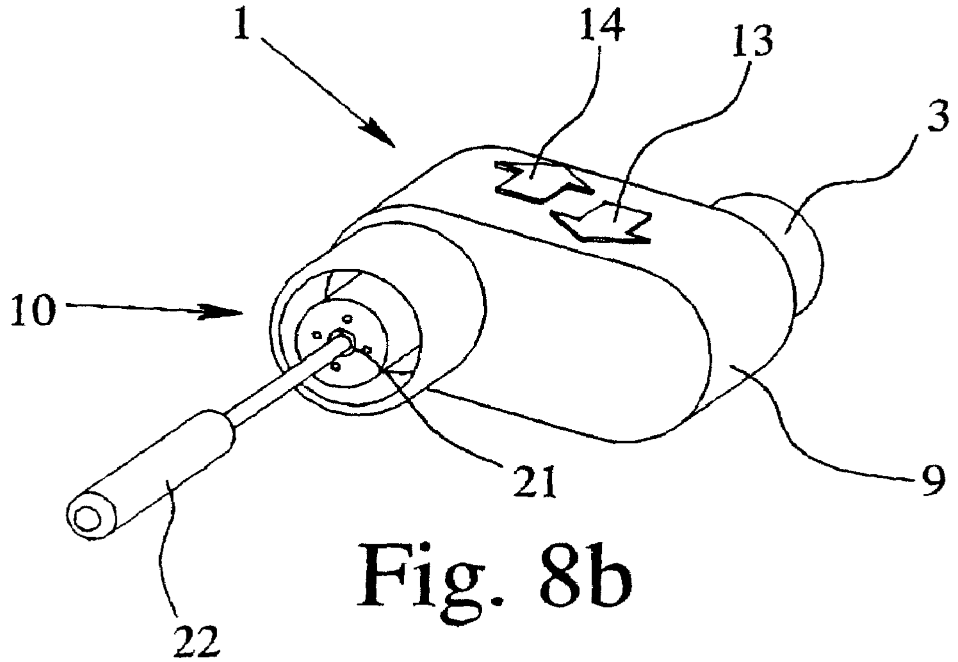

Finally, FIGS. 8*a* & 8*b* show two modified versions of the FIG. 2 electrical connector 1, the electrical connector 1, in both cases, having electromechanical write protection to safeguard the data stored in the memory. In the embodiment shown in FIG. 8*a*, there is a pin 20 in the housing 9 for this purpose, activation of the write protection taking place simply by pressing the pin 20 into the housing 9. In the embodiment as shown in FIG. 8*b*, conversely, an opening 21 is formed within the second plug-and-socket connection 10 into which an actuating element 22 must be inserted for actuation of the write protection, for example, the tip of a screwdriver. The activation element for the write protection within the housing 9 can be, for example, a Hall sensor or an optical sensor.

What is claimed is:

1. Electrical connector for connection to a sensor which has an integrated microcontroller, comprising:

a plug-and-socket connection for connection to an interface of the sensor, and an electronic circuit having a memory for storage of data, and a microcontroller for operating an interface of the sensor, the microcontroller being able to mirror data of the sensor in the memory of the electronic circuit and to parameterize the sensor with data from the memory of the electronic circuit, and depending on characteristic data of the sensor, the microcontroller either causes parameter data to be read out of the sensor via the interface and stored in the memory of the electronic circuit, or causes parameter data stored in the memory of the electronic circuit to be read out of the memory of the electronic circuit and transmitted via the interface into the sensor, wherein said microcontroller has means for comparing characteristic data from the sensor with characteristic data stored in the memory of the electronic circuit; and wherein the microcontroller is adapted to determine whether data is to be transferred from the memory of the electronic circuit to the sensor or is to be transferred from the sensor to the memory of the electronic circuit automatically based upon a comparison of the characteristic data of the sensor in the sensor with characteristic data stored in the memory of the electronic circuit.

2. Electrical connector as claimed in claim 1, further comprising a housing for holding the electronic circuit and a second plug-and-socket connection for connecting a cable which has a corresponding connector.

3. Electrical connector as claimed in claim 1, further comprising a housing for holding the electronic circuit and a cable for connecting the sensor to a power supply, the cable being permanently connected to one of the housing and the electronic circuit.

4. Electrical connector as claimed in claim 1, further comprising a housing for holding the electronic circuit and two display elements arranged in the housing for visualization of the operating state of the connector in the housing.

5. Electrical connector as claimed in claim 4, wherein the display elements are in the shape of two arrows pointing in opposite directions for displaying which of the directions of data transfer to and from the memory is occurring.

6. Electrical connector as claimed in claim 2, wherein the memory is an interchangeable storage medium which is insertable into and removable from the housing.

7. Electrical connector as claimed in claim 1, further comprising an electronic or electromechanical write protection for safeguarding data stored in the memory.

8. Electrical connector as claimed in claim 2, wherein an inscription field or a holding device for an inscription plate is provided on the housing.

9. Electrical connector as claimed in claim 1, wherein the plug-and-socket connection comprises M12 or M8 connector pairs.

10. Distributor box for connection of several sensors or actuators to a common bus line, comprising at least two connector pairs via which individual sensors or actuators are connectable to the distributor box by a cable, at least one electrical connector located within the housing of the distributor box and connected to at least one connector pair, said at least one electrical connector comprising an electronic circuit having a memory for storage of data, and a microcontroller for operating an interface of the sensors or actuators, the microcontroller being able to mirror data of the sensors or actuators in the memory of the electronic circuit and to parameterize the sensors or actuators with data from the memory of the electronic circuit, and depending on characteristic data of the sensor, the microcontroller either causes parameter data to be read out of the sensors or actuators via the interface and stored in the memory of the electronic circuit, or causes parameter data stored in the memory of the electronic circuit to be read out of the memory of the electronic circuit and transmitted via the interface into the sensors or actuators, wherein said microcontroller has means for comparing characteristic data from the sensor with characteristic data stored in the memory of the electronic circuit; and wherein the microcontroller is adapted to determine whether data is to be transferred from the memory of the electronic circuit to the sensor or is to be transferred from the sensor to the memory of the electronic circuit automatically based upon a comparison of the characteristic data of the sensor in the sensor with characteristic data stored in the memory of the electronic circuit.

* * * * *